April 21, 1959  O. SORGE  2,883,352
HIGH TEMPERATURE RESISTANT MOLDING COMPOSITION
CONTAINING PHENOL FORMALDEHYDE
CONDENSATION PRODUCT
Filed June 28, 1955
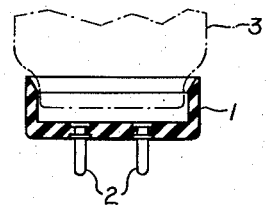
Inventor:
Ottokar Sorge,
by  Otto Tichy
His Attorney

United States Patent Office 2,883,352
Patented Apr. 21, 1959

2,883,352

HIGH TEMPERATURE RESISTANT MOLDING COMPOSITION CONTAINING PHENOL FORMALDEHYDE CONDENSATION PRODUCT

Ottokar Sorge, Berlin-Frohnau, Germany, assignor to Patent-Treuhand-Gesellschaft für elektrische Gluhlampen m.b.H. (Patent Fiduciary Company for Electric Incandescent Lamps Ltd.), a German company Application June 28, 1955, Serial No. 518,568

3 Claims. (Cl. 260—19)

The present invention relates to molding compositions containing artificial or synthetic resin and particularly useful for making lamp base and socket parts.

The known commercial molding compositions of this kind hardenable by heat and pressure are capable of withstanding at the most temperatures of about 150 to 200 degrees C., according to the synthetic resin and the filling materials used. Molding compositions resistant to higher temperatures are highly desirable for use as electric insulating parts, especially for bases and sockets for electric lamps.

The principal object of the present invention is to provide such molding compositions resistant to temperatures as high as at least 250 degrees C. up to and including 300 degrees C. Another object of the invention is to provide a lamp base including a molded member containing synthetic resin and resistant to such temperatures. Other objects and advantages of the invention will appear from the following description of species thereof.

The temperature resistance of molding compositions of this kind depends upon the percentage of synthetic resin in the total weight of the composition. The commercial molding compositions contain about 40 to 50 percent of synthetic resin. The temperature resistance thereof may be increased considerably by reducing the percentage of synthetic resin and by using temperature-resistant inorganic compounds as fillers, particularly oxides or carbonates. Such filler materials may react chemically with the artificial resin when heated to obtain improved characteristics of the molding composition.

In accordance with the present invention, a molding composition capable of resisting temperatures of at least 250 up to about and including 300 degrees C. is obtained by decreasing the percentage of synthetic resin in the total weight of the composition down to about 25 percent while using a considerable percentage of the usual inorganic materials, such as those identified above, as fillers. More specifically, the molding composition according to this invention consists of no more than about 25 percent of the total weight of the composition of synthetic resin including a novolak (a thermo-setting resin) having a phenol base, a condensation or hardening medium and a gliding or mold lubricating medium, and 60 to 80 percent, inclusive, of inorganic fillers, 20 to 40 percent, inclusive, of which are manganese dioxide, 5 to 15 percent, inclusive, kaolin, 10 to 40 percent, inclusive, magnesium oxide and 5 to 20 percent, inclusive, asbestos.

The preferred condensation or hardening medium is hexamethylene tetramine and the preferred gliding or mold lubricating medium is a fat or fatty acid, such as stearic or palmitic acid. Manganese dioxide and magnesium oxide have the property of reacting chemically with the artificial resin to increase the coherence and the temperature resistance of the molding composition. When desired, small quantities, in the amount of about 1 percent, of metallic oxide may be added to the mix.

The manganese dioxide serves in addition as a coloring means so that it is not necessary to use organic coloring material which, it has been found, has a deleterious effect by reducing the temperature resistance of the molding composition. The other fillers serve only as carriers for the resin. The heat conductivity and the coefficient of expansion of the molding composition may be modified slightly by varying the filler percentages because the physical properties of the individual fillers are different from each other.

Examples of molding compositions embodying the invention are the following in which the ingredients are given in percentages by weight:

20 to 25%, preferably 20%, phenol formaldehyde condensation product
2 to 4%, preferably 3%, hexamethylene tetramine
2 to 5%, preferably 4%, stearic acid
20 to 40%, preferably 29%, manganese dioxide
5 to 15%, preferably 7%, kaolin
20 to 40%, preferably 21%, magnesium oxide
5 to 20%, preferably 16%, asbestos According to the invention, the molding composition containing synthetic resin is made by heating the pulverized ingredients to a temperature of 90 to 120 degrees C., inclusive, in a rotating drum until the ingredients are thoroughly mixed, which requires about two to four hours. The resulting molding composition can be worked into desired shapes with no more difficulty than other known molding compositions having a lower temperature resistance.

The working temperature is about 200 degrees C. The working pressure is about 70 kg./cm.$^2$ and the working time about 60 to 80 seconds.

Bases or parts of bases for electric incandescent lamps and discharge lamps consisting of the molding composition formed in this manner are capable of withstanding without damage temperatures up to about 250 to 300 degrees C., so that heating of the base or base parts consisting of the molding composition to these temperatures may be accomplished without deforming or blistering such pressed parts.

The molding composition of the present invention has good heat conductivity because of its fillers and this property of the material is highly advantageous when bases made of the molding composition are cemented to lamp bulbs. Bases consisting of the new molding composition may be used with conventional basing cements having a curing temperature of about 200 degrees C. without the necessity for embedding metallic elements in the base to protect it from excessive temperatures developing in parts thereof during the basing operation. The necessary heat conduction is supplied by the molded composition itself during the hardening of the usual basing cement.

In the single figure of this drawing accompanying and forming part of this specification a fluorescent lamp base is shown in a side elevational, partly sectional view with an end of the tubular envelope of the lamp shown in broken lines.

Referring to the drawing, the base comprises a cup-like part 1 of electrically insulating material which, in accordance with the present invention, consists in percentages by weight of 20 percent phenol formaldehyde condensation product, 3 percent of hexamethylene tetramine, 4 percent stearic acid, 29 percent manganese dioxide, 7 percent kaolin, 21 percent magnesium oxide and 16 percent asbestos. This material, after being thoroughly intermixed while being heated as described

[end of page]

above is molded into the form shown under a pressure of 70 atmospheres at a temperature of 200 degrees C.

The metal contact pins 2 of the base are incorporated in the base structure when the insulating part 1 of the base is so molded. The completed base is secured to an end of a tubular glass envelope 3, such as the envelope of a fluorescent discharge lamp. This base may be attached by means of a heat curable basing cement, which usually includes a synthetic resin, directly to the glass bulbs or tubes of electric discharge fluorescent lamps. Cement curing or hardening temperatures in the order of about 250 degrees C. and higher may be used without damage to the part 1 of the new base, because of the inherent good thermal conductivity of the molded insulating part 1 of the base.

When desired, the inorganic filling material of the molding composition may consist of magnesium oxide and asbestos with the filling material constituting 60 to 80 percent, inclusive, by weight of the total weight of the composition of which material 20 to 40 percent, inclusive, consists of magnesium oxide and 5 to 20 percent, inclusive, of asbestos.

The usual basing cements for securing metal bases to glass lamp envelopes may be used for securing the plastic base of the present invention to such lamp envelopes. For example, a known cement containing rosin, shellac and a composition comprising the product of condensation of phenol, furfural and formaldehyde to which has been added dibutyl phthalate, hexamethylene tetramine, benzoyl peroxide and wood flour is satisfactory for use in securing the base 1 and 2 to a glass lamp envelope such as the envelope 3 shown in the drawing.

What I claim as new and desire to secure by Letters Patent of the United States is:

1. A molding composition capable of withstanding temperatures of 250 to 300° C., having good heat conduction, a working temperature of about 200° C., a working pressure of about 70 kg./cm.$^2$, a working time of about 60 to 80 seconds and consisting essentially by weight of:

20 to 25% phenol formaldehyde condensation product
2 to 4% hexamethylene tetramine
2 to 5% stearic acid
20 to 40% manganese dioxide
5 to 15% kaolin
20 to 40% magnesium oxide
5 to 20% asbestos 2. A base for an electrical device, said base being capable of withstanding temperatures of 250 to 300° C. and including an electrically insulating member having good heat conduction, said member consisting of a molding composition having a working temperature of about 200° C., a working pressure of about 70 kg./cm.$^2$ and a working time of about 60 to 80 seconds, said composition consisting essentially by weight of:

20 to 25% phenol formaldehyde condensation product
2 to 4% hexamethylene tetramine
2 to 5% stearic acid
20 to 40% manganese dioxide
5 to 15% kaolin
20 to 40% magnesium oxide
5 to 20% asbestos 3. A base for an electrical device, said base being capable of withstanding temperatures of 250 to 300° C. and including an electrically insulating member having good heat conduction, said member consisting of a molding composition having a working temperature of about 200° C., a working pressure of about 70 kg./cm.$^2$ and a working time of about 60 to 80 seconds, said composition consisting essentially by weight of:

20% phenol formaldehyde condensation product
3% hexamethylene tetramine
4% stearic acid
29% manganese dioxide
7% kaolin
21% magnesium oxide
16% asbestos References Cited in the file of this patent

UNITED STATES PATENTS

| | | |
|---|---|---|
| 1,674,961 | Diamond | June 26, 1928 |
| 1,896,042 | Ruben | Jan. 31, 1933 |
| 2,022,827 | Ruben | Dec. 3, 1935 |
| 2,280,517 | Ridgway et al. | Apr. 21, 1942 |
| 2,357,409 | Kuzmick | Sept. 5, 1944 |
| 2,385,384 | Schroy | Sept. 25, 1945 |
| 2,712,533 | Michell | July 5, 1955 |
| 2,729,553 | Price | Jan. 3, 1956 |

OTHER REFERENCES

Ellis: The Chemistry of Synthetic Resins, pages 370, 436–438, Reinhold (1935).